(No Model.)
A. E. ARMSTRONG.
CONDUCTOR TUBE FOR GRAIN DRILLS.
No. 246,445. Patented Aug. 30, 1881.
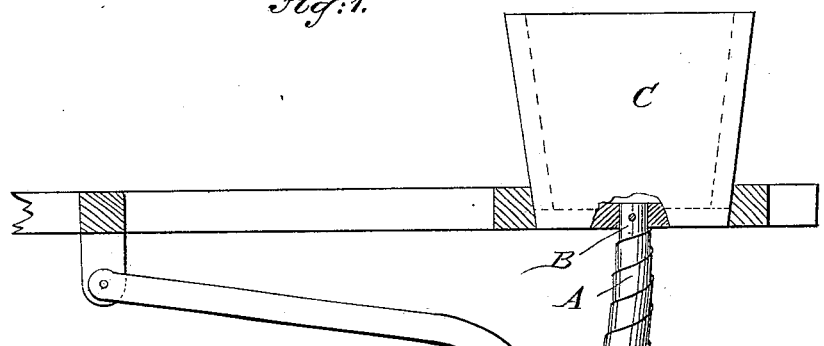
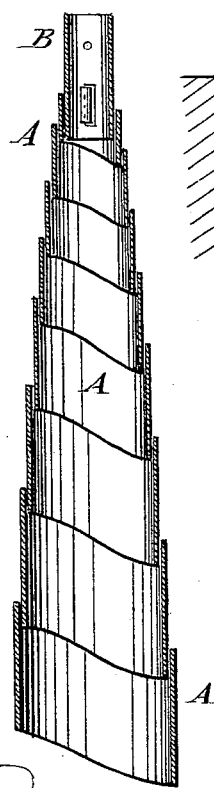
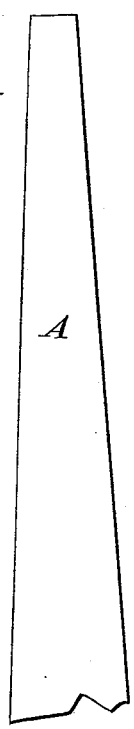
WITNESSES:
INVENTOR:
A. E. Armstrong
BY
ATTORNEYS.

UNITED STATES PATENT OFFICE.

ASHLEY E. ARMSTRONG, OF EAST CLARIDON, OHIO.

CONDUCTOR-TUBE FOR GRAIN-DRILLS.

SPECIFICATION forming part of Letters Patent No. 246,445, dated August 30, 1881.

Application filed June 25, 1881. (No model.)

*To all whom it may concern:*

Be it known that I, ASHLEY E. ARMSTRONG, of East Claridon, in the county of Geauga and State of Ohio, have invented certain useful Improvements in Conductor - Tubes for Grain-Drills and Fertilizer-Distributers, of which the following is a specification.

Figure 1 is a side elevation of my improvement, shown as applied to the plow and seed-box of a grain-drill. Fig. 2 is a sectional side elevation of the tube detached. Fig. 3 is a plan view of a portion of the strip or blank from which the tube is formed.

Similar letters of reference indicate corresponding parts.

The object of this invention is to produce conductor-tubes for grain-drills and fertilizer-distributers so constructed that the plows can adjust themselves to uneven land, and can rise to pass obstructions without disarranging the tubes or interfering with their proper operation.

The invention consists in a conductor-tube for grain-drills and fertilizer-distributers, constructed of a tapering strip of sheet metal coiled spirally, and having a short tube attached to its upper end, whereby the said tube, when attached to the plow and seed-box of the machine, will allow the plow to have free play, as will be hereinafter fully described.

In forming my improved tube I take a strip, A, of some suitable sheet metal which has the necessary strength and elasticity and coil it into spiral form, as shown in Figs. 1 and 2. The upper or smaller end of the strip A is attached to the lower end of a short tube, B, as shown in Fig. 2. The upper end of the tube B is secured in the discharge-opening of the box C, that receives the grain or fertilizer, so that the said grain or fertilizer can readily pass into and through the tube A B. The lower or larger end of the coiled tube A is attached to the plow D, that opens a channel to receive the seed or fertilizer. The lower end of the tube A may be strengthened by a band passed around and secured to it.

If desired, the draw-bar of the plow D may be formed with a ring or curve to pass around the lower end of the conductor-tube, and to which the said lower end can be secured.

With this construction, the tube A will contract and expand easily as the plow D moves up and down in passing over uneven ground, and when the said plow is raised to pass obstructions.

With this construction, also, the interior or passage-way of the conductor-tube will always be open and free, so that the grain or fertilizer can pass freely into and through it, whether the said tube be contracted or expanded.

The conductor-tube thus constructed can be readily attached to the seed - box and plow of any ordinary grain-drill or fertilizer-distributer without necessitating any change in the construction of said machine.

Having thus fully described my invention, I claim as new and desire to secure by Letters Patent—

1. A conductor-tube for grain-drills and fertilizer-distributers constructed, substantially as herein shown and described, of a tapering strip of sheet metal coiled spirally and attached at its upper end to a short tube, whereby a flexible extension - tube is produced for connecting the plow and seed-box, as set forth.

2. The combination, with the seed-box and the plow of a grain - drill or fertilizer - distributer, of the flexible extension-tube formed of a spirally - coiled tapering strip, A, of sheet metal, having a short tube, B, attached to its upper end, substantially as herein shown and described, whereby the plow is allowed to move freely in adjusting itself to uneven land and in passing obstructions without interfering with the proper operation of the tube, as set forth.

ASHLEY EUGENE ARMSTRONG.

Witnesses:
B. ARMSTRONG,
A. B. KNAPP.